United States Patent [19]

Connick et al.

[11] 3,901,980
[45] Aug. 26, 1975

[54] MANUFACTURE OF CURED MEAT PRODUCT
[75] Inventors: Francis Glenn Connick, Downers Grove, Ill.; Waldemar Veazie, Jr., Woods Hole, Mass.
[73] Assignee: Swift & Company, Chicago, Ill.
[22] Filed: Sept. 10, 1973
[21] Appl. No.: 395,395

[52] U.S. Cl. .............................. 426/231; 426/513
[51] Int. Cl.² ........................................ G01N 33/12
[58] Field of Search ............ 426/513, 371, 231, 212

[56] References Cited
UNITED STATES PATENTS

| | | |
|---|---|---|
| 1,943,019 | 1/1934 | Henney et al. ........................ 426/513 |
| 2,899,311 | 8/1959 | Zick ....................................... 426/371 |
| 2,907,662 | 10/1959 | Covey .................................. 426/371 |
| 2,940,862 | 6/1960 | Forsyth ............................ 426/371 X |
| 3,050,399 | 8/1962 | Kielsmeier et al. ............. 426/371 X |
| 3,075,843 | 1/1963 | Maas et al. ........................... 426/272 |

*Primary Examiner*—Raymond N. Jones
*Attorney, Agent, or Firm*—Edward T. McCabe; Charles E. Bouton; W. C. Davis

[57] ABSTRACT

Cured meat trimmings are processed by grinding, mixing and concurrently chilling, preferably by the direct intermixing of dry ice, and then molding to form highly uniform patties suitable for canning.

2 Claims, No Drawings

MANUFACTURE OF CURED MEAT PRODUCT

This invention relates to an improved method of forming meat patties; and more specifically relates to a method for forming uniform patties, of accurate size from previously cured uncooked meat, which are suitable for canning.

Heretofore consumers have had a wide variety of processed meat products available. These products have generally been catagorized as either fresh, cured, fresh-frozen, cooked, or canned items. The canned items have been both shelf stable (that is of relatively indefinite shelf life at room temperature) and pasteurized (requiring refrigeration and having a limited, although extended, shelf life). Although frozen products are often thought to have long, but definite, shelf life while frozen, the fact is that frozen meats will become rancid through an oxidative action and the onset of rancidity is hastened by the presence of salt. Other categories of items have relatively short shelf lives. Most uncanned cured meat products, for instance, even where refrigerated, have an approximate limit of 30 days shelf life.

Accordingly, it may be noted that from the storage standpoint, and to the advantage of both the processor and consumer, canned products are preferred. However, the variety of canned meat items has been somewhat limited because of the effect of processing on product flavor and because the usual shape of the items have often been awkward to can. Moreover, meat items vary greatly in size and shape with the resultant non-uniformity requiring oversize cans to be filled with large amounts of gravies and other fluids. Even processed items such as patties and links have been found to be relatively nonuniform in size because the meat particles tend to shrink and/or expand in an unpredictable manner and successive links or patties have tended to differ in dimensions.

From another standpoint, that of the processor, it should also be noted that there has been a need to devise a quality outlet or use for trimmings from cured meat items. Cured hams, bacon bellies, and other cured primal parts are often trimmed to achieve a degree of uniformity and to produce a quality product. Such trimmings represent a valuable supply of highly processed and hence valuable meat. However, there is little opportunity to use the cured trimmings because of their limited shelf life and additional ingredients.

Fresh meat trimmings are in abundant supply, can be frozen and stored for substantial periods, and can be ground and used in large quantities in making many sausage type products. Even through many sausage products are cured, the curing steps are undertaken after the ground meat material has been assembled. Hence, previously cured trimmings would complicate the curing process by upsetting the amounts of curing salts and water required for a batch of meat. Therefore, a new utilization of cured meat trimmings is desirable to permit the efficient and profitable use of such meat.

Accordingly it is a principal object of the present invention to provide an improved method for utilizing trimmings of previously cured meat in the production of patties.

It is another object of the present invention to provide an improved process for producing a canned cured meat product.

It is yet another object of the present invention to provide an improved method for producing highly uniform patties from trimmings of previously cured meat.

In general the present invention contemplates mixing ground cured trimmings and concurrently cooling same to reduce the temperature of said trimmings to below 28°F. and preferably to about 18°F. Thereafter, the mixed and chilled ground cured trimmings are molded into patties at a low temperature whereby each patty retains substantially the size and weight produced in the molding step.

In greater detail, the present invention is believed applicable to virtually all types of cured meats, but is of greatest advantage when applied to the trimmings from cured hams. Such cured trimmings may contain 0.5-4.0% sodium chloride (NaCl), 0.1-0.5% phosphates, and added moisture (water, such as utilized in pickling brines) ranging from 0 to 20%. Additionally, the cured trimmings may include minor amounts of flavor ingredients as may normally be encountered in curing formulas.

Additionally, the trimmings utilized may vary greatly as to fat content. A high proportion of lean meat is desired in the final product and upon grinding the trimmings it is necessary that the fat content may be adjusted by the addition of relatively fat or lean ingredients to a maximum proportion of 28-45% fat in the ground material. It has also been found that the trimmings should be inspected and tendons and gristle removed; and in this regard it has been further found that the accumulated cured trimmings should not include more than 12% shank meat.

The cured trimmings should be pre-chilled by storing at 26°-28°F. while being accumulated for use in the subject process. For best results the process should be applied to batches of 100 pounds or more.

When a sufficient quantity of cured trimmings have been accumulated and pre-chilled the meat is subdivided to particles of one-eighth to one-half inch dimensions. Preferably, the trimmings are ground to three-sixteenths inch particles. Thereafter the ground trimmings are sampled at several locations in the batch and the samples combined and analyzed for fat content. The fat content should preferably be 28-30% of the batch; and if the analysis indicates the proportion of fat is above or below the range of 28-30% the batch is adjusted by adding appropriate quantities of ground lean or fat tissue from previously cured meats to bring the fat content within the specified range.

At this stage minor amounts of additional flavor ingredients may be introduced into the adjusted ground trimmings. The ground meat is first placed in a mixer apparatus such as a "Buffalo" mixer marketed by the John E. Smith's Sons Co. of Buffalo, N.Y. or similar equipment. The additional flavor ingredients, such as liquid smoke, may be added while the mixer paddles are briefly turned to distribute the meat and ingredients. Preferably the flavor ingredients should be diluted to facilitate distribution throughout the ground cured meat.

The ground cured meat should then be mixed and agitated to release proteins and other juices and materials which promote binding of the meat particles when molded into patties. The requisite mixing time will depend upon the speed of the mixer paddles and the degree to which the mixer is loaded toward its capacity. However, a mixing period of from one to fifteen minutes should be sufficient, usually a period of about 6 to 8 minutes is adequate. Preferably the temperature of the ground cured trimmings is further reduced concurrently with the mixing of same. It has been found that best results and consistent uniformity of molded patties are obtained where the ground cured trimmings are reduced to approximately 18°F.; and this can be best accomplished by adding a sufficient quantity of dry ice particles (solid carbon dioxide) directly to the ground cured trimmings in the mixer immediately before commencement of the mixing operation. Where the trimmings have been pre-chilled to 26°-28°F. a quantity of about 17 pounds of soft dry ice nuggets per 100 pounds of meat will usually be sufficient for this purpose.

Preferably the mixer should be of the vacuum type and should be run for several minutes with the vacuum pumps operating while the mixing vessel lid is loosely closed. This will permit air to be drawn through the vessel so as to purge the ground cured meat of carbon dioxide gas sublimating from the dry ice. A brief additional period of mixing under vacuum (with the vessel tightly closed) will complete the mixing step.

Thereafter the batch is emptied from the mixer and held at 18°-20°F. for a period of ½ to 1 hour to further insure total dissipation of the dry ice.

The mixed ground cured trimmings are now ready to be molded into patties. Preferably the ground meat should be molded before the temperature thereof increases more than a few degrees. Best results are achieved where the ground cured meat is molded at a temperature not exceeding 24°F. Any commercially available patty molding equipment may be used to form uniform size patties. However, it is advantageous to maintain the supply hopper of such apparatus filled with 20-200 pounds of meat at all times and not allow it to become empty. Patties of ground cured meat should be compacted by the apparatus at 10-80 psig and may range in size from 1 to 6 inches in diameter and ⅛ to 2 inches thick.

It is also preferred to place interleaves of silicone treated paper between successive patties, and then place a specified number of patties in a metal can. Thereafter the can is closed and sealed under vacuum conditions; and the can and contents heat processed. For pasteurization under refrigeration storage requirements, the cans should be held in 170°F. water for about 2 hours and until an internal temperature of 150°F. is reached in the patties.

EXAMPLE I

One hundred pounds of fresh cured ham trimmings at 28°F. are ground through a three-sixteenth inch plate using a two-blade matched knife and plate. The ground meat is analyzed by taking ten samples of 16 oz. each from the fat and lean trimmings used and then adjusting to 30% fat where required. The 100 pounds of ground cured meat is placed in a vacuum mixer and 3 ounces of diluted liquid smoke (1 oz. "Charsol" H-6 hickory smoke flavoring in 2 oz. water) is added while turning the mixer paddles through about six revolutions. Thereafter 17 pounds of soft dry ice nuggets are added to the meat in the mixer and the machine is loosely closed and operated for 4 minutes at about 50 R.P.M. with vacuum pumps functioning. The mixer is briefly stopped after 4 minutes to securely close the vessel and then operated for an additional 2 minutes.

Thereafter the mixer is emptied and the ground cured meat held for up to 1 hour at 18°-20°F. The 100 pounds of meat are then placed in the hopper of a Hollymatic Model 500-A patty forming machine utilizing a 3 31/32 by 5/16 inch mold plate. Each patty is ejected and interleaved with 4½ inch square sheet of 35 pound silicone treated paper. The interleaved patties are stacked nine high, and an inverted 404 × 309, can carefully telescoped thereover. The filled can is then righted and the exposed corners of the upper interleaves are tucked inward. Thereafter the cans are closed and sealed (22 inch Hg vacuum) washed, inspected for good seal and seams; and then processed for two hours in 170°F. water.

It was found that the patties formed in the foregoing manner were uniformly 2.33 oz. in weight and the net weight for nine patties per can was 21 oz. (plus or minus 0.3%). The patties also uniformly retained the size of the mold.

Obviously many modifications and variations of the invention as hereinbefore set forth may be made without departing from the spirit and scope thereof, and, therefore, only such limitations should be imposed as are indicated in the appended claims.

We claim:

1. An improved process for manufacturing food patties from cured ham trimmings, said process comprising: collecting quantities of cured ham trimmings and storing same at 26°-28°F.; grinding the collected trimmings through a three-sixteenths inch plate; analyzing the ground trimmings for fat content; adjusting the fat content of the ground trimmings by adding relatively fat and lean ground trimmings to a level of 28-30%; placing the adjusted ground trimmings in a vacuum mixer; adding to the adjusted ground trimmings a sufficient quantity of soft dry ice nuggets to reduce the temperature of said trimmings to about 18°F; agitating said trimmings and dry ice for a first period while drawing air through the mixer so as to purge the material of gaseous $CO_2$; agitating said trimmings for a second period under vacuum; emptying said mixed trimmings from said mixer and holding same at a temperature of 18°-20°F. for a period sufficient to permit final dissipation of residual dry ice; and thereafter molding the mixed ground trimmings into uniform patties while said mixed ground trimmings does not exceed 24°F.

2. An improved process for manufacturing food patties from cured ham trimmings, said process comprising: collecting quantities of cured ham trimmings and storing same at 26°-28°F.; grinding the collecting trimmings; analyzing the ground trimmings for fat content; adjusting the fat content of the ground trimmings by adding relatively fat and lean ground trimmings to a desired fat-lean ratio; placing the adjusted ground trimmings in a vacuum mixer; adding to the adjusted ground trimmings a sufficient quantity of a volatile cooling agent to reduce the temperature of said trimmings to about 18°F.; agitating said trimmings and cooling agent for a first period while drawing air through the mixer so as to purge the material of gaseous agent; agitating said trimmings for a second period under vacuum; emptying said mixed trimmings from said mixer and holding same at a temperature of 18°-20°F. for a period sufficient to permit final dissipation of residual cooling agent; and thereafter molding the mixed ground trimmings into uniform patties while said mixed ground trimmings remains chilled.

\* \* \* \* \*